United States Patent
Francois et al.

(10) Patent No.: US 8,175,153 B2
(45) Date of Patent: May 8, 2012

(54) METHOD OF ENCODING AND DECODING AN IMAGE SEQUENCE BY MEANS OF HIERARCHICAL TEMPORAL ANALYSIS

(75) Inventors: Edouard Francois, Bourg des Comptes (FR); Guillaume Boisson, Rennes (FR); Jérôme Vieron, Bedee (FR); Philippe Robert, Thorigne Fouillard (FR); Gwenaelle Marquant, La Chapelle Chaussee (FR)

(73) Assignee: Thomson Licensing (FR)

( * ) Notice: Subject to any disclaimer, the term of this patent is extended or adjusted under 35 U.S.C. 154(b) by 1320 days.

(21) Appl. No.: 10/590,307

(22) PCT Filed: Feb. 21, 2005

(86) PCT No.: PCT/FR2005/050109
§ 371 (c)(1),
(2), (4) Date: Jun. 27, 2007

(87) PCT Pub. No.: WO2005/086489
PCT Pub. Date: Sep. 15, 2005

(65) Prior Publication Data
US 2008/0025394 A1    Jan. 31, 2008

(30) Foreign Application Priority Data
Mar. 2, 2004   (FR) ..................................... 04 50420

(51) Int. Cl.
*H04N 7/12* (2006.01)
(52) U.S. Cl. ......... 375/240.11; 375/240.12; 375/240.16; 375/240.19
(58) Field of Classification Search .................... None
See application file for complete search history.

(56) References Cited

U.S. PATENT DOCUMENTS
5,235,420 A    8/1993  Gharavi
(Continued)

FOREIGN PATENT DOCUMENTS
WO     WO 01/06794     1/2001

OTHER PUBLICATIONS

Hyun Duk Cho et al: "3-D Medical Image Compression Using an Adaptive Mode Selection Technique in Wavelet Transform Domain", Proceedings of the Picture Coding Symposium, Apr. 21, 1999. pp. 91-94.

(Continued)

*Primary Examiner* — Christopher S Kelley
*Assistant Examiner* — Christopher Findley
(74) *Attorney, Agent, or Firm* — Jack Schwartz and Associates PLLC

(57) ABSTRACT

The method realizes a motion compensated temporal filtering (MCTF), the temporal filtering being replaced by an intra mode coding to obtain at least one low (L) or high (H) frequency picture if the current picture has a level of correlation with a lower previous picture at a threshold, the low frequency pictures obtained (L) being thus scaled to be adapted, at the energy level, to the pictures obtained by motion compensated temporal filtering, and comprises, at the end of analysis:
  a selection of the pictures obtained by intra coding of a picture of a low decomposition level with the additional condition, for the high frequency pictures, that this picture is derived itself from an intra coding.
  a calibration of the picture selected by carrying out at least one reverse step of the scaling step.
The applications relate to video compression with temporal prediction.

12 Claims, 3 Drawing Sheets

U.S. PATENT DOCUMENTS 7,321,625 B2 * 1/2008 Zhang et al. ............. 375/240.11
2003/0169936 A1 * 9/2003 Zandi et al. ................. 382/240
2004/0008785 A1 * 1/2004 Turaga et al. ............ 375/240.19

OTHER PUBLICATIONS

W-L Hsu et al: "Video Compression Using Adaptive Wavelet Packet and DPCM", Proceedings of the SPIE, vol. 2605, 1995, pp. 158-169.

A. Secker et al: "Motion-compensated highly scalable video compression using an adaptive 3D wavelet transform based on lifting", Proceedings 2001 International Conference on Image Processing, ICIP 2001, Thessaloniki. Greece, Oct. 7-10, 2001, International Conference on Image Processing, New York, NY, vol. 1 of 3, Conf. 8, Oct. 7, 2001, pp. 1029-1032.

J-R Ohm: "Complexity and Delay Analysis of MCTF Interframe Wavelet Structures" ISO/IEC JTC1/SC29/WG11 MPEG02/M8520, Jul. 2002, pp. 1-16.

Jae-Yong Lee et al: "Motion-compensated layered video coding for playback scalability" IEEE Transactions on Circuits and Systems for Video Technology, IEEE, USA, vol. 11, No. 5, May 2001, pp. 619-628.

Search Report Dated June 27, 2005.

* cited by examiner

METHOD OF ENCODING AND DECODING AN IMAGE SEQUENCE BY MEANS OF HIERARCHICAL TEMPORAL ANALYSIS

This application claims the benefit, under 35 U.S.C. §365 of International Application PCT/FR05/050109, filed Feb. 21, 2005, which was published in accordance with PCT Article 21(2) on Sep. 15, 2005 in French and which claims the benefit of French patent application No. 0450420, filed on Mar. 2, 2004.

The invention relates to a method of video coding and decoding of a picture sequence coded by hierarchical temporal analysis exploiting the motion compensated temporal filtering.

The scope is that of video compression based on spatial and/or temporal scalability diagrams also known as "scalables". This involves for example a 2D+t wavelet coding comprising a motion compensated temporal filtering.

In the hybrid coding standards, such as MPEG-1, MPEG-2, MPEG-4, h264, as in most of the 2D+t subband coding diagrams, such as MC-EZBC, acronym for Motion Compensated Embedded Zero Block Context, the first step of the coding system consists of taking advantage of the temporal redundancy between successive images, before exploiting the spatial redundancy within an image.

Figure 1:
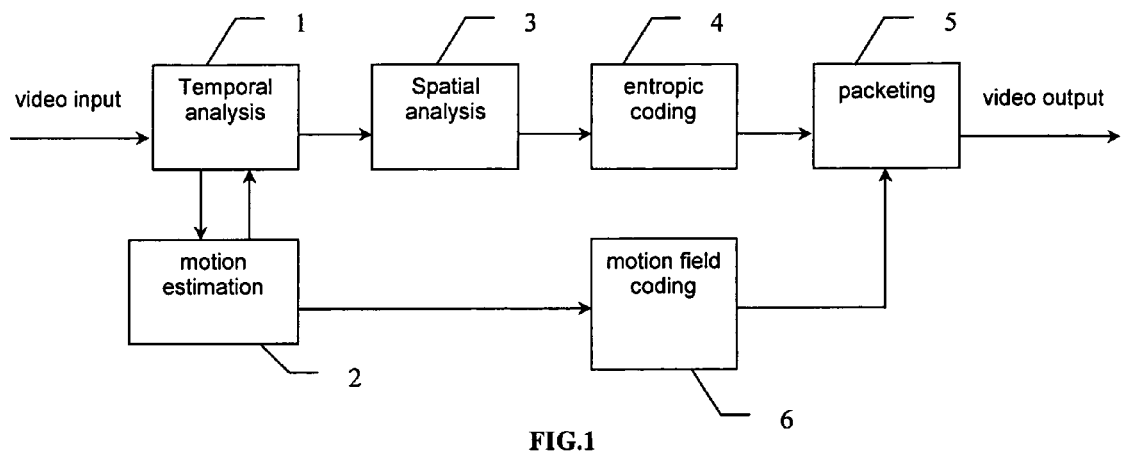

FIG. 1 shows a diagram of a video coder according to the prior art.

The video signal is transmitted to a temporal analysis circuit 1. A motion estimation circuit 2 is connected to this first circuit to estimate the motion between two images received by the coder. The motion information is transmitted to the circuit 1 and to a coding circuit 6, for example in the form of motion vector fields. The output of circuit 1 is sent to a spatial analysis circuit 3 that extracts, from the texture, the frequency coefficients of the picture. These coefficients are then quantized and coded by entropic coding, circuit 4. The coded information and motion information is sent to a packeting circuit or packetizer 5 that sends the video data in the form of video packets to constitute the video data flow.

The temporal analysis circuit 1 performs motion compensated temporal prediction in the case of a hybrid diagram or a motion compensated temporal filtering in the case of a subband coding diagram. The coding algorithms with temporal prediction consist in operating motion compensation to generate prediction pictures that will subsequently used in the coding process. These algorithms are based on the same principle. The pictures to code are predicted from one or more previously coded pictures, called reference pictures. This is the case in the video MPEG standards with the Predicted (P) and Bi-directional or Bi-predictive (B) pictures. Prediction consists in carrying out a motion compensation operation from these reference pictures and motion vectors associated with the current picture. What is then coded is the residue of the prediction, that is, the difference between the current picture and the temporal prediction picture. The motion is for example described by pixel blocks and the motion compensation carried out per block.

The spatial analysis circuit 3 realizes a wavelet decomposition or a discrete cosine transform. The entropic coding of circuit 4 can be a VLC type coding, acronym for Variable Length Coding, or an arithmetic coding.

The function of the packeting circuit is to cut up the texture and motion information coming respectively from the entropic coding circuit and the motion field coding circuit into consistent sub-sets according to their spatial and temporal frequency and to their size, for example their weight in a bit plane coding approach. Hence, the binary flow obtained is scalable independently in resolution, field frequency and fidelity.

The estimated motion fields correspond to the resolution of the source. The motion compensation step of the coder, whether it is by filtering or prediction is therefore executed on full resolution pictures whereas in the decoder, the motion compensation step can be executed on pictures of a lower resolution, with rescaled motion fields.

The main purpose of motion compensated temporal filtering, also known by the acronym MCTF, is to generate high frequency pictures H requiring the minimum of bits for the coding. Another constraint is to reduce as far as possible the number of non-connected pixels, that is, not connected by motion vectors. These two aspects are directly dependent on the quality of the motion field. The filtered information is all the more correlated as the motion used for the filtering is of good quality.

In some cases, this quality of motion is unsatisfactory, for example if the motion is too complex, too great or if there is a scene cut. This consequently results in an excess of energy in the high frequency pictures H and in the significant number of pixels not connected in the low frequency pictures L, finally in a high coding cost and a poor distribution of the visual quality within the decoded group of pictures.

The use of adaptive GOP enables this problem to be taken into account. The size of the GOP is adapted dynamically according to the percentage of non-connected pixels. If the total number of pixels non-connected in a picture is greater to a predefined threshold, for example in the order of 60 to 75%, during the motion estimation carried out at a decomposition level 1, the temporal decomposition into subbands is stopped. The size of the initial GOP is modified to give two GOPs, the size of the first GOP being forced automatically to 21. This solution however requires the use of GOPs of variable sizes, and the management of such GOPs is complex.

Another solution consists in exploiting other coding modes such as intra mode coding, during the temporal decomposition. If there are a large number of non-connected pixels, an intra coding is carried out. But the dynamics of the pictures must then be adapted to that of the pictures obtained by MCTF filtering, leading to an additional coding cost. This to the detriment of the pictures coded according to the MCTF mode and therefore of the overall quality of the reconstituted picture sequence.

The invention aims to overcome the disadvantages described above.

One of the purposes of the invention is a method for coding a picture sequence comprising a hierarchical temporal analysis of a group of pictures performing a motion compensated temporal filtering of successive pairs of pictures to supply low temporal frequency pictures and high temporal frequency pictures at different temporal decomposition levels, this analysis realizing, for a given temporal decomposition level and for a pair of low temporal frequency pictures, a motion estimation step of a current picture B to a previous reference picture A to supply motion vectors then a motion compensated temporal filtering of these pictures to supply a low temporal frequency picture (L) and a high temporal frequency picture (H) at a greater decomposition level, the said temporal filtering being replaced by an intra mode coding to obtain at least one low (L) or high (H) frequency picture if the current picture has a level of correlation with a previous picture lower than a threshold, the low frequency pictures (L) obtained being thus scaled to be adapted, at the energy level, to the pictures obtained by the said motion compensated temporal filtering, characterized in that, among the low frequency picture and the final high frequency decomposed pictures obtained at the end of the analysis:

it selects the pictures obtained by intra coding of a picture at a lower decomposition level with the additional condition, for the high frequency pictures, that this picture is derived itself from an intra coding.

it calibrates the picture selected by carrying out at least one reverse step of the scaling step.

The number of reverse steps carried out corresponds to the number of successive intra coding operations of a low frequency picture (L) to arrive at the picture selected if this involves a high frequency selected picture, this number being increased by one if it involves the low frequency selected picture (L).

According to a particular implementation, the method comprises, for the calculation of a low L or high H frequency image, a temporal filtering between the current picture and a following picture of the following pair of pictures, if the correlation between the current picture and the previous picture is lower than a threshold and if the correlation between the current picture and this following picture is greater than a threshold, the other H or L picture being obtained by intra coding and in that this filtering operation is assimilated with the intra coding and not with the temporal filtering for the selection step.

According to a particular implementation, the method assigns a picture number to each picture of the group of pictures, it monitors these numbered pictures during the decomposition by attributing a counter for each number, this counter being updated at each step, the counter is increased each time a low frequency picture (L) is obtained in intra mode, the counter remains unchanged each time a high frequency picture (H) is obtained in intra mode or during a temporal filtering with a following picture, the counter is reset each time a picture is obtained by motion compensated temporal filtering with a previous picture.

The invention also concerns a decoding procedure of a sequence of pictures coded according to the method described above, characterized in that it carries out a reverse calibration step of selected pictures to decode, the selection of the pictures and the number of reverse steps being dependent on the information associated with the picture to decode. This information is for example the value of the counter assigned to the picture during the coding.

The invention also relates to a coder for the implementation of the method described, comprising a temporal analysis circuit using the motion compensated temporal filtering and the intra coding, characterized in that the circuit selects, among the low frequency picture and the final high frequency decomposed pictures obtained at the end of analysis, the pictures obtained by an intra coding of a picture at the lower decomposition level or by a temporal filtering between the current picture and a following picture at the lower decomposition level, with the additional condition, for the high frequency pictures, that this picture is derived itself from an intra coding and in that it carries out at least one scaling step for the pictures selected.

The invention also relates to a decoder for the decoding of picture sequences coded according to the method of claim 1, comprising a temporal synthesis circuit, characterized in that the circuit comprises means for performing a reverse calibration of pictures to decode, the selection of the pictures and the number of reverse calibrations being dependent on an item of information associated with the picture to decode and received by the decoder.

Owing to this reverse scaling operation of intra type pictures, the pictures coded according to the MCTF mode are not penalized. The distribution of the quality of the pictures on the entire GOP comprising both intra pictures coded in intra mode or according to the MCTF mode is improved. The coding mode information sent to the decoder enable the intra pictures to be recalibrated to carry out the synthesis of the pictures.

The temporal filtering being carried out in a conditional manner, according to the quality of the motion, the temporal decomposition into subbands can be carried out up to the last level. Irrespective of the quality of the motion, the GOP structure is kept. The size of the GOPs can be kept constant, facilitating the management of bit-rates and processing, even if a scene cut occurs in the middle of a GOP. If variable size GOPs are used, the picture quality is improved.

Figure 2:
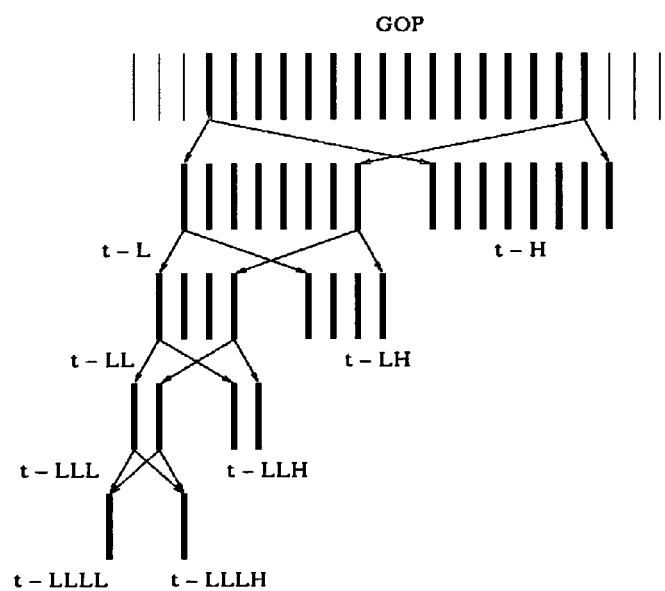
Figure 3:
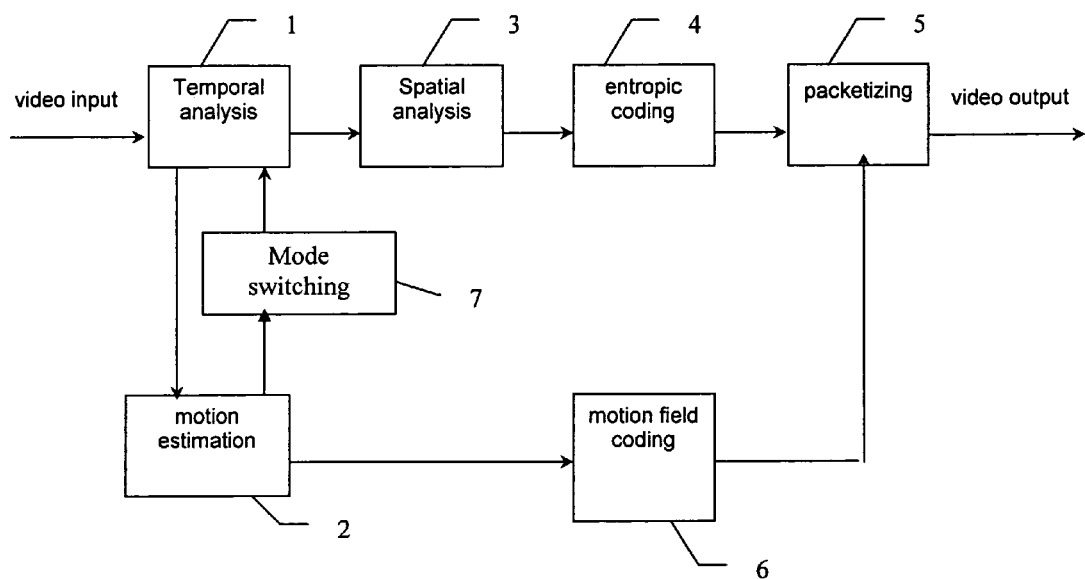
Figure 5:
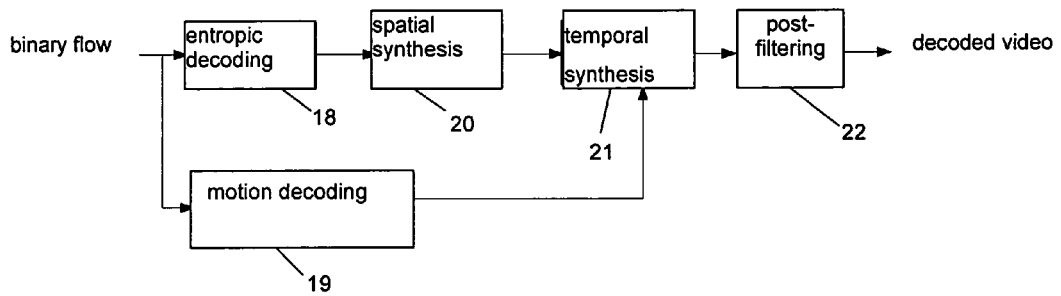
Figure 4:
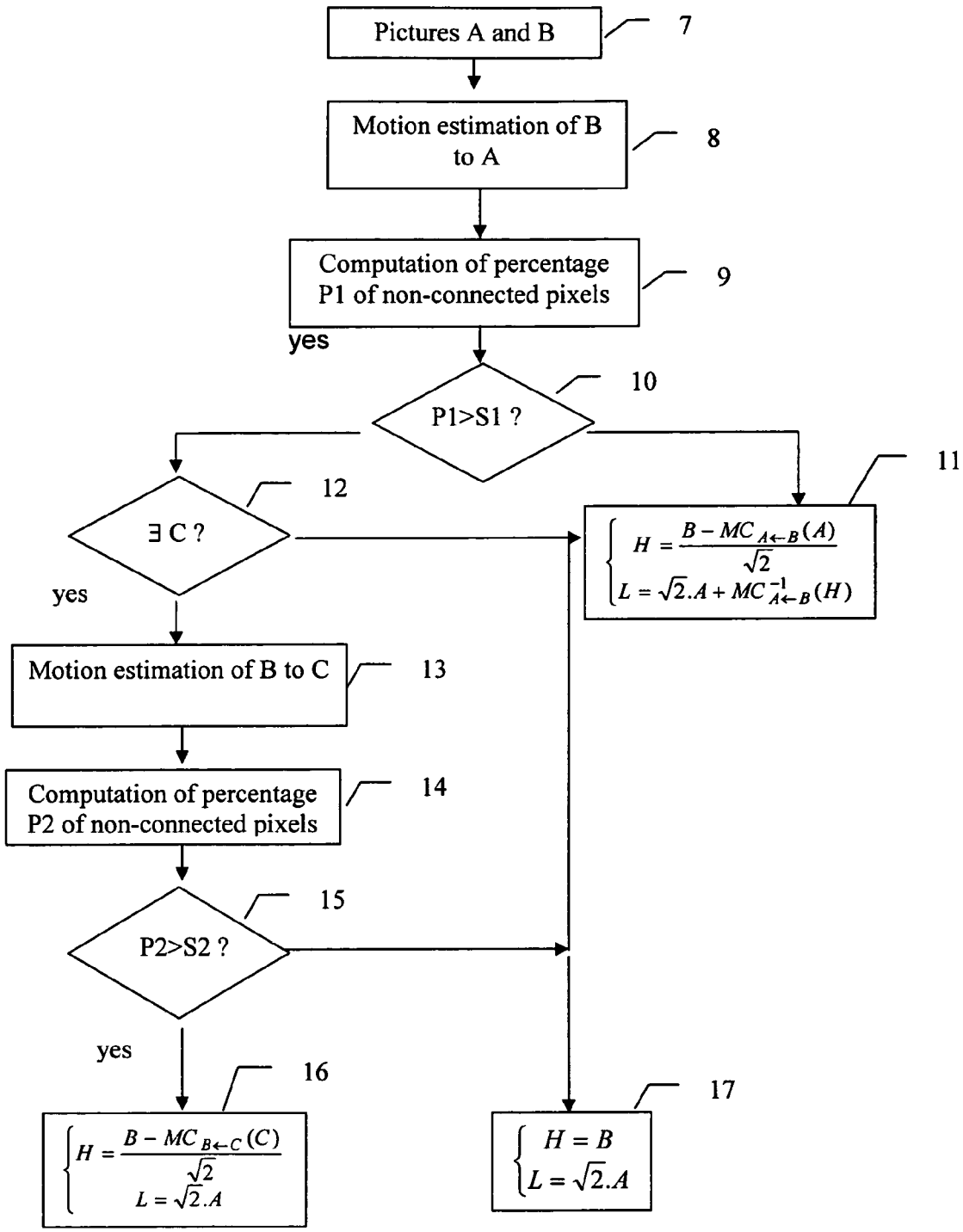

Other specific features and advantages will emerge more clearly in the following description, the description provided as a non-restrictive example and referring to the annexed drawings wherein:

FIG. 1 a coding diagram according to prior art,

FIG. 2, a motion compensated temporal filtering on a GOP of 16 pictures,

FIG. 3, a coding circuit,

FIG. 4, a coding flow chart,

FIG. 5, a decoding circuit.

FIG. 2 shows in a summary manner the motion compensated temporal filtering operations performed by the temporal analysis circuit 4, with a 4-level decomposition for GOPs comprising in this example, 16 pictures shown in thick lines.

The filtering mode used is called "lifting". Instead of using a complex filtering for the wavelet coding, using a linear filter of a great length, in our example the filtering will be carried out on a group of 16 pictures, this filtering method consists, in a known manner, of "factorising" the filter by using limited length filters, for example two if it is decided to filter the samples two by two, this filtering being renewed for each decomposition level. One therefore considers the case in which the filtering in the direction of motion is carried out on pairs of pictures. The low frequency and high frequency filtering on each of the pairs of the GOP, produces respectively 8 low temporal frequency images (t-L) and 8 high temporal frequency images (t-H) at the first temporal decomposition level.

The low temporal frequency images are then decomposed again according to the same method. The low pass filtering of these pictures provides 4 new low temporal frequency pictures t-LL and the high pass filtering of these same pictures provides 4 high temporal frequency pictures t-LH. The third decomposition level provides 2 low temporal frequency pictures t-LLL and 2 high temporal frequency pictures t-LLH. The fourth and last level provides a low temporal frequency picture t-LLLL and a high temporal frequency picture t-LLLH.

This temporal decomposition is a 5 band temporal decomposition that therefore generates 1 t-LLLL picture, 1 t-LLLH picture, 2 t-LLH pictures, 4 t-LH pictures, and 8 t-H pictures per GOP of 16 pictures. The t-L, t-LL, t-LLL pictures and naturally the original pictures are ignored for the downstream coding as they are at the origin of the decomposition into subbands to provide de-correlated pictures at each level. This decomposition thus enables a new distribution of the energy by generating a useful picture with a low temporal frequency t-LLLL, which represents an average of the set of the GOP and in which is concentrated the energy and four levels of pictures of low energy high temporal frequency pictures, namely 5 frequency bands. It is these pictures that are sent to the spatial analysis circuit for spatial decomposition into sub-bands.

To perform the filtering, a motion field is estimated between each pair of pictures to be filtered and this for each level. This is the function of the motion estimator 7.

In a practical manner, only a motion vector field is computed, from A to B or from B to A. The other motion vector field is deducted from the first, generating non-connected pixels, that is not assigned a motion vector and corresponding to holes in the reverse motion vector field.

The filtering operation is carried out on each picture pair of the original GOP, to obtain a first level of temporal resolution. The process is repeated several times on the resulting pictures of the low temporal frequency band, to obtain the following temporal resolution levels. For a GOP of 16 pictures, the process generates 8 temporal frequency bands called L, H, LL, LH, LLL, LLH, LLLL, LLLH.

As indicated above, the problem of non-connected pixels results in a poorer decorrelation during the temporal filtering and therefore a poorer compression of the data. It can occur at each of the decomposition levels of the GOP where a motion estimation operation is performed.

According to one embodiment of the invention, a mode switching circuit is implemented to control the temporal analysis, circuit controlled by the relevance of the motion estimation. It can manage the case where a large number of non-connected pixels is obtained during the motion estimation operation.

FIG. 4 shows a device with such a circuit. The same references are used to designate the circuits similar to those FIG. 1, which are not described again.

The motion information coming form the motion estimation circuit, with the reference 2, are sent to a mode switching circuit, with the reference 7. This circuit is connected to the temporal analysis circuit 1 to send it the motion information and the information on the coding mode to use.

FIG. 4 shows a simplified flow chart of the algorithm implemented for the operation of the switching circuit.

That is A and B two successive pictures of a given temporal decomposition level, available in the step referenced 7. The motion is for example estimated from the picture B to the picture A and the picture A is therefore the reference picture. A step referenced 8 estimates the motion of this picture B to the picture A. The following step 9 computes the percentage P1 of non-connected pixels in the reference picture A with respect to the number of pixels of the picture, that is, the number of pixels to which no motion vector is assigned. The following step referenced 10 compares this percentage P1 with a threshold S1 that is a predefined value. This value is for example a percentage in the order of 20 to 25%.

If the number of pixels not-connected is less than or equal to this value, the motion vector field is considered as correct and the next step is step 11, which performs a standard filtering operation.

The low and high frequency pictures are thus computed:

$$\begin{cases} H = \dfrac{B - MC_{A \leftarrow B}(A)}{\sqrt{2}} \\ L = \sqrt{2} \cdot A + MC_{A \leftarrow B}^{-1}(H) \end{cases}$$

This filtering, equivalent to the filtering described, consists in first calculating the picture H. This picture is obtained from point to point difference of the picture B and the motion compensated picture A. Hence, a certain value is removed from a pixel B, interpolated if necessary, pointed by the displacement vector in A, motion vector computed during the motion estimation of the picture B to the picture A.

The picture L is then deducted from the picture H and no longer the picture B, by addition of the picture A to the reverse motion compensated picture H.

$$MC_{A \leftarrow B}^{-1}(H)$$

corresponds to a motion "decompensation" of the picture (H). Hence, one adds, to a pixel of A, a certain value, interpolated if necessary, located, in the picture H, at the base of a displacement vector from B to A and pointing to the A pixel.

If the percentage of pixels not connected is greater than the threshold S1, the motion vector field is considered as not relevant and step 12 follows step 10.

At the temporal level processed, if there is a picture C after the picture B, test carried out in step 12, this picture C becomes a possible new reference picture and the motion is estimated from the picture B to the picture C, step 13.

If there is no picture after the picture B at the current level processed, step 17 follows step 12. This step codes the pictures B and A into intra mode with the appropriate scale factor for the picture A.

$$\begin{cases} H = B \\ L = \sqrt{2} \cdot A \end{cases}$$

Step 14, which follows step 13, computes a percentage P2 of pixels non-connected in the picture C for the motion vector field computed between B and C.

The following step 15 compares this percentage P2 with a threshold S2 that is a predefined value. This value is for example a percentage in the order of 20 to 25%.

If the number of pixels not-connected is less than or equal to this value, the motion vector field is considered as correct and the next step is step 16, which performs a standard filtering operation but with this picture C. This is the backward prediction mode. The low and high frequency pictures are thus computed:

$$\begin{cases} H = \dfrac{B - MC_{B \rightarrow C}(C)}{\sqrt{2}} \\ L = \sqrt{2} \cdot A \end{cases}$$

The information of the picture A is thus found in the picture L and the energy of the picture H is reduced by taking this reference in the future for the filtering rather than by simply choosing the picture B or filtering it from a previous non-correlated picture. A high frequency image of low energy is thus obtained.

If the percentage of non-connected pixels is lower than the threshold S2, step 17 follows step 12. This step 17 codes the pictures B and A in intra mode with the appropriate scale factor for the picture A, as in the MCTF mode or the previous backward prediction mode.

$$\begin{cases} H = B \\ L = \sqrt{2} \cdot A \end{cases}$$

The reverse is naturally possible, which consists in taking the picture A as high frequency picture (H=A) and the picture B as the low frequency picture. One can for example choose, for L, the picture with the least energy.

Steps 11, 16 and 17 are therefore coding modes determined by the mode switching circuit, information sent to the temporal analysis circuit.

The choice of mode is here carried out for the complete picture. It is naturally just as conceivable to carry out a selection of the mode for each of the blocks or macroblocks of the picture.

The term $\sqrt{2}$ called the scale factor, relating for example to the "real" pictures L, that is, obtained by an MCTF filtering, is due to the MC lift filtering. This scale factor, also attributed to the intra mode coding of the pictures A, enables the same energy value to be obtained at the level of the pictures and aims to facilitate the matching during the motion estimation for the next temporal level, the pictures being then uniform in terms of energy.

The elementary filtering stage described above is realized for each picture pair of a given temporal level and this for each temporal level up to the summit of the temporal pyramid of the GOP, irrespective of the relevance of the motion vector fields, irrespective of the mode. This means it is possible not to be affected by false scene cuts, corresponding for example to a rapid movement of the camera, revealing areas hidden up to that point.

At the end of the process, the pictures A and B that have been coded in intra mode at a given decomposition level and that have not been used as a reference picture or prediction picture for the MCTF mode or for the backward prediction mode at the following temporal decomposition levels, are rescaled to match the last level for which its pixels have been used for these modes:

$$F_i' = F_i / \sqrt{2}^{n(F_i)}$$

$F_i$ is the picture L or H resulting from the filtering of the picture A and B and $F'_i$ this picture $F_i$ rescaled.

The exponent n to apply to the scale factor is given according to the mode, by the following formulas:

MCTF mode $$\begin{cases} n(L) = 0 \\ n(H) = 0 \end{cases}$$

Prediction mode or intra coding mode:

$$\begin{cases} n(L) = n(A) + 1 \\ n(H) = n(B) \end{cases}$$

The value of n is thus calculated, for an image L or H at a given decomposition level, according to the value of n attributed to the picture A or B of the previous decomposition level, used respectively for the computation of L or H.

Thus, if the pictures A and B are processed according to the MCTF mode to give the pictures L and H, then, irrespective of their level n(A) and n(B), the level n attributed to these pictures L and H is forced to zero.

If the prediction or intra mode is used to provide the pictures L and H from the pictures A and B, assigned of the level n(A) and n(B), the level of the picture L is that of n(A) increased by one and the level of the picture H is that of the picture B, n(B).

By referring to FIG. 2, if one considers a scene cut after the fourth picture of the GOP leading to an intra coding carried out for the first time at the third level of decomposition for the two pictures t-LLL then at the fourth and last level, the value of n(L) is equal to 2 for the picture t-LLLL and the value of n(H) is equal to 1 for the picture t-LLLH. Thus, by dividing the picture t-LLLL twice by the scale factor, one finds the picture t-LL that corresponds to the last level at which this picture is used for the MCTF mode.

It is possible to assign a number to each of the original pictures of the GOP. Numbers are next attributed to the decomposed pictures, a filtering of a picture A numbered s with a picture B numbered t giving a low frequency picture numbered s, L corresponding to A, and a high frequency picture numbered t, H corresponding to B. For example, the numbers obtained for the pictures of the levels t-LLLL, t-LLLH, t-LLH are 1, 9, 5 and 13. For each decomposition level, the computation of n for a numbered picture i then consists in an increase of the level n assigned to the picture i of the previous level in the case where this picture undergoes intra or predictive coding to give a low frequency picture L. The counter remains unchanged if this picture undergoes an intra or predictive coding to give a high frequency image H. The counter is reset if this picture undergoes an MCTF coding. The value n attributed to each original picture of the GOP is reset. The computation is carried out at each decomposition level up to the last level.

In fact, the value n attributed to a decomposed picture corresponds:

for a final picture obtained by MCTF filtering, to the value zero, for a final low frequency picture obtained by intra coding, to the number of intra coding operations realized on the picture of the same number resulting in this low frequency picture, increased by one, for a high frequency picture obtained by intra coding, to the number of successive intra coding operations realized on the picture of the same number resulting in this high frequency picture, for a high frequency picture obtained from temporal filtering with a following picture, to the number of successive intra coding operations realized on the picture of the same number, increased by one, resulting in the picture that is the object of this temporal filtering.

This last resealing step aims to calibrate the dynamic of the transformed pictures, which are not "real" temporal subbands, that is, subband pictures obtained by MCTF filtering, by reducing the weight of these images.

The calibrated subband picture is a picture that is not exploited for the synthesis of the two pictures A and B, reason for which its cost is reduced.

The bit-rate allocation is realized by the packetizer 5. The orthogonality of the temporal transform, and also its normalisation, are essential points so that the bit-rate allocation is optimal among the different pictures. What is realised in a natural manner during a standardised MCTF filtering can become a problem when other modes such as the backward prediction mode or the intra coding mode are implemented. If, in a coding step, a low frequency image is obtained, in intra or predictive mode, by multiplying the picture A by a scale factor to reach the dynamic of the temporal level, that is, to obtain a picture of the same energy as the pictures obtained by MCTF filtering, this weighting is no longer required at the level of bit allocation. On the contrary, particular care must be taken to favour the "real" low frequency pictures obtained by MCTF filtering, the pertinent reference pictures, for example by giving less weight to pictures coded in intra or predictive mode. Indeed, the real low frequency pictures, as has been seen above, are used at the decoder for the reconstruction of the two pictures A and B at the lower decomposition level, according to the hierarchical pyramid, B being a function of A, which is not the case for the pictures coded in intra or predictive mode.

The invention also relates to a decoder using the data coded according to the method described above. FIG. 5 represents such a decoder.

The binary flow corresponding to the pictures coded according to the method described herein are sent to the decoder input. They are sent in parallel to the input of an entropic decoding circuit 18 and to the input of a motion decoding circuit 19. The entropic decoding circuit is connected successively to a spatial synthesis circuit 20 and to a temporal synthesis circuit 21. This latter receives motion information from the motion decoding circuit. The output of the temporal synthesis circuit is connected to the input of a post-filtering circuit 22, the output of which is the decoder output.

The bitstream is therefore processed by the entropic decoding circuit 18, which performs the inverse operations of the entropic coding circuit and decodes the spatio-temporal wavelet coefficients and the filtering modes.

The motion decoding circuit 19 recovers and decodes the information relating to the motion from the flow, in order to send the motion fields required for the temporal synthesis to the circuit 21.

The spatial synthesis circuit 20 reconstructs the pictures corresponding to the different temporal subbands. The reconstructed subband pictures are then scaled from the appropriate scale factor, to carry out the temporal synthesis. This scaling is carried out according to the mode information sent and relating to the pictures used during the decomposition of the original GOP, to the coder, enabling the values of n to be assigned to the different pictures.

$$F_i = F_i' \cdot \sqrt{2}^{n(F_i)}$$

Next, the temporal synthesis circuit 21 reconstructs the pictures transformed up to the temporal level required, according to their mode:

MCTF mode $$\begin{cases} A = \dfrac{L - MC_{A \leftarrow B}^{-1}(H)}{\sqrt{2}} \\ B = \sqrt{2} \cdot H + MC_{A \leftarrow B}(A) \end{cases}$$

backward prediction mode $$\begin{cases} A = L/\sqrt{2} \\ B = \sqrt{2} \cdot H + MC_{B \to C}(C) \end{cases}$$

intra coding mode $$\begin{cases} A = L/\sqrt{2} \\ B = H \end{cases}$$

The motion information required for motion compensation comes from the motion decoding circuit. The temporal synthesis performs a decoding operation according to the coding mode information assigned to the picture to decode.

The pictures at the output of the circuit 21 are therefore reconstructed from temporal wavelet coefficients. A final post-processing step is applied by the post-filtering circuit 22 by performing a filtering on the picture enabling the block effect type artefacts to be reduced.

The percentage P1 and/or P2 used to determine the switching mode is chosen in the order of 20 to 25%. This percentage was obtained empirically and other values can naturally be used for the implementation of the switching procedure.

The motion used for temporal filtering of a pair of pictures can be obtained by simplification or pruning of the motion vector field computed by motion estimation, enabling the motion coding cost to be limited.

A variant of the invention consists in combining a adaptive GOP structure with the method previously described. The size of the GOP is then variable, depending for example on parameters such as the motion in the sequence.

The invention also applies to a hybrid type temporal analysis circuit as well as a subband coding type.

The applications of the invention relation to video compression with temporal prediction.

The invention claimed is:

1. A method for coding a picture sequence comprising a hierarchical temporal analysis of a group of pictures performing a motion compensated temporal filtering of successive pairs of pictures to supply low temporal frequency pictures and high temporal frequency pictures at different temporal decomposition levels, this analysis realizing, for a given temporal decomposition level and for a pair of low temporal frequency pictures, a motion estimation operation of a current picture B to a previous reference picture A to supply motion vectors then a motion compensated temporal filtering of these pictures to supply a low temporal frequency picture (L) and a high temporal frequency picture (H) at a greater decomposition level, the temporal filtering being replaced by an intra mode coding to obtain at least one low (L) or high (H) frequency picture if the current picture has a level of correlation with a previous picture lower than a threshold, the low frequency pictures (L) obtained being thus scaled to be adapted, at the energy level, to the pictures obtained by the motion compensated temporal filtering, the method comprising, among the low frequency picture and the final high frequency decomposed pictures obtained at the end of the analysis: a selection operation to select the low (L) or high (H) frequency pictures obtained by intra coding of a picture at a lower decomposition level with the additional condition, for the high frequency pictures, that this picture is derived itself from an intra coding, and a calibration operation to calibrate the selected pictures by carrying out at least one reverse operation of the scaling operation, for their coding.

2. The method according to claim 1, wherein the number of reverse operations carried out corresponds to the number of successive intra coding operations of a low frequency picture (L) to arrive at the picture selected if this involves a low frequency selected picture, this number being decreased by one if it involves the high frequency selected picture (H).

3. The method according to claim 1, comprising, for the calculation of a low L or high H frequency image at a given temporal level, a temporal filtering between the current picture and a following picture of the following pair of pictures of the lower temporal level, if the correlation between the current picture and the previous picture is lower than a threshold and if the correlation between the current picture and this following picture is greater than a threshold, the other H or L picture of the given temporal level being obtained by intra coding, this filtering operation being assimilated with the intra coding and not with the temporal filtering for the selection operation.

4. The method according to claim 1, comprising: assigning a picture number to each picture of the group of pictures, and monitoring these numbered pictures during the decomposition by attributing a counter for each number, this counter being updated as follows:
- the counter is increased each time a low frequency picture (L) is obtained in intra mode,
- the counter remains unchanged each time a high frequency picture (H) is obtained in intra mode or during a temporal filtering with a following picture,
- the counter is reset each time a picture is obtained by motion compensated temporal filtering with a previous picture,
- the reverse operations being carried out according to the value of the counters.

5. The method according to claim 1, wherein the high frequency pictures H and low frequency pictures L are obtained, during the motion compensated temporal filtering of two successive pictures A and B, from the following operations:

$$\begin{cases} H = \dfrac{B - MC_{A \leftarrow B}(A)}{\sqrt{2}} \\ L = \sqrt{2} \cdot A + MC_{A \leftarrow B}^{-1}(H) \end{cases}$$

MC corresponding to the motion compensation according to the B to A motion vector field, of the picture A or H, and wherein the pictures L and H are obtained, from intra coding, according to the formulas $$\begin{cases} H = B \\ L = \sqrt{2} \cdot A \end{cases}.$$

6. The method according to claim 3, wherein the pictures H and L are obtained by filtering with the following picture for H and by intra coding for L, according to the following formulas:

$$\begin{cases} H = \dfrac{B - MC_{B \to C}(C)}{\sqrt{2}} \\ L = \sqrt{2} \cdot A \end{cases}$$

MC corresponding to the motion compensation according to the B to C motion vector field, of the picture C.

7. The method according to claim 1, wherein the calibrated pictures obtained by temporal analysis are then processed by spatial analysis.

8. The method according to claim 1, wherein the level of correlation is calculated by taking into account the number of connected pixels, that is, connected by a motion vector.

9. A coder for the implementation of the method according to claim 1, comprising a temporal analysis circuit using the motion compensated temporal filtering and the intra coding, the circuit selecting, among the low frequency picture and the final high frequency decomposed pictures obtained at the end of analysis, the pictures obtained by an intra coding of a picture at the lower decomposition level, with the additional condition, for the high frequency pictures, that this picture is derived itself from an intra coding, and the circuit carrying out at least one scaling operation for the pictures selected.

10. A decoding method for a sequence of coded images, the coding realizing an intermediate operation of hierarchical temporal analysis of the motion compensated temporal filtering (MCTF) type providing high frequency and low frequency pictures for their coding, the method comprising:
- a decoding operation giving high frequency and low frequency decoded pictures,
- at least one reverse calibration operation for pictures selected from the high and low frequency decoded pictures, the selection of the pictures and the number of reverse operations being dependent on an element of information associated with the coded picture, to provide pictures to synthesize, and
- a temporal synthesis operation from decoded pictures not selected and said pictures to synthesize.

11. The method according to claim 10, wherein the information associated with the coded picture is the value of a counter assigned to the picture during the coding.

12. A decoder for the implementation of the method according to claim 10, comprising a decoding circuit to provide high and low frequency decoded pictures and a temporal synthesis circuit of pictures to synthesize, also comprising means to perform a reverse calibration of selected high and/or low frequency decoded pictures to provide pictures to be synthesized, the selection of the pictures and the number of reverse calibrations being dependent on an element of information associated with the picture to decode, and received by the decoder.

* * * * *